United States Patent
Gellert et al.

[11] Patent Number: 6,074,191
[45] Date of Patent: Jun. 13, 2000

[54] FIVE LAYER INJECTION MOLDING APPARATUS HAVING FOUR POSITION VALVE MEMBER ACTUATING MECHANISM

[75] Inventors: Jobst Ulrich Gellert, Georgetown; Denis L. Babin, Acton, both of Canada

[73] Assignee: Mold-Masters Limited, Georgetown, Canada

[21] Appl. No.: 08/977,676

[22] Filed: Nov. 24, 1997

[30] Foreign Application Priority Data

Oct. 23, 1997 [CA] Canada ................................ 2219235

[51] Int. Cl.⁷ .................................................. B29C 45/22
[52] U.S. Cl. ...................... 425/130; 264/328.8; 425/549; 425/564; 425/570; 425/572
[58] Field of Search ..................... 425/130, 572, 425/570, 562, 564, 566, 549; 264/328.8

[56] References Cited

U.S. PATENT DOCUMENTS 4,657,496  4/1987  Ozeki et al. .

Primary Examiner—Tim Heitbrink
Attorney, Agent, or Firm—Dalesman & Company

[57] ABSTRACT

Valve gated multi-cavity injection molding apparatus for five layer molding having actuating mechanisms for reciprocating elongated valve members between four different positions. Each actuating mechanism has a front and a rear aligned cylinders, a first piston connected to the head of one of the valve members in the front cylinder and second and third pistons in the rear cylinder. The third piston has a stem portion which extends forwardly through the second piston into the front cylinder. Hydraulic pressure from four hydraulic lines connected to each actuating mechanism reciprocates each elongated valve member between the different positions. In the first closed position, the front end of the valve member is seated in the gate. In the second position, the front end of the valve member is retracted sufficiently to allow an initial amount of PET to flow from an outer annular melt channel through the gate. Then the valve member is retracted further to a third position to allow simultaneous flow of the PET and a barrier material from an inner annular melt channel. Then the valve member is retracted to a fully open position which allows the simultaneous flow of PET from a central melt channel. When the cavity is almost filled, the valve member returns briefly to the second position for filling before returning to the closed position for ejection.

11 Claims, 6 Drawing Sheets

FIVE LAYER INJECTION MOLDING APPARATUS HAVING FOUR POSITION VALVE MEMBER ACTUATING MECHANISM

BACKGROUND OF THE INVENTION

This invention relates generally to a multi-cavity injection molding apparatus for five layer molding and more particularly to such apparatus having actuating mechanisms for reciprocating elongated valve members between four different positions.

Multi-cavity injection molding apparatus for making five layer protective containers for food or preforms or parisons for beverage bottles are known. Two layers of a barrier material such as ethylene vinyl alcohol copolymer (EVOH) or nylon are typically molded between two outer layers and a central layer of a polyethylene terephthalate (PET) type material. However, this has previously been done by sequentially injecting first the PET, then the barrier material and finally the PET again. While this is satisfactory for some applications, sequential molding has the disadvantage that it requires relatively expensive tooling.

Valve gated multi-cavity injection molding apparatus having elongated valve members which reciprocate are also known. For instance, U.S. Pat. No. 4,657,496 to Ozeki et al. which issued Apr. 14, 1987 shows an actuating mechanism having an outer piston reciprocating in an outer cylinder and a inner piston reciprocating in an inner cylinder. The inner piston drives the elongated valve member and the outer piston drives a stem surrounding the elongated valve member and they operate in a controlled injection cycle to sequentially mold three layer products. None of the prior art actuating mechanisms are capable of reciprocating the elongated valve members between four different positions according to the present invention to provide five layer molding by simultaneous injection.

SUMMARY OF THE INVENTION

Accordingly, it is an object of the present invention to at least partially overcome the disadvantages of the prior art by providing a valve gated multi-cavity injection molding apparatus for five layer molding having fluid actuating mechanisms for reciprocating each elongated valve member between four different positions.

To this end, in one of its aspects, the invention provides a multi-cavity sprue gated injection molding apparatus for multi-layer molding having at least one melt distribution manifold with a front face and a plurality of heated nozzles mounted in a mold. Each heated nozzle has a rear end abutting against the melt distribution manifold and a front end adjacent a gate leading to a cavity in the mold. Each heated nozzle has a first central melt channel and second and third melt channels extending therethrough from the rear end to the front end. An elongated valve member has a rear end and a front end extending through the melt distribution manifold into the central melt channel in each heated nozzle. The rear end of each elongated valve member is operatively connected to valve member actuating mechanism mounted in the mold. A first melt passage for conveying melt from a first melt source branches in the melt distribution manifold dividing to extend both around the elongated valve member in the first central melt channel and through the third melt channel in each heated nozzle to the gate. A second melt passage for conveying melt from a second melt source branches in the melt distribution manifold and extends through the second melt channel in each heated nozzle to the gate. Each valve member actuating mechanism reciprocates the elongated valve member between a first closed position and second, third and fourth positions according to a continuous predetermined injection cycle. Each valve member actuating mechanism comprises means to retract the elongated valve member from the first closed position to the second position wherein the front end of the elongated valve member is retracted sufficiently to allow melt from the first melt source flow through the third melt channel in the nozzle and the gate into the cavity for a predetermined period of time. It also comprises means to then further retract the elongated valve member to the third position wherein the front end of the elongated valve member is retracted sufficiently to allow simultaneous flow of melt from the second melt source through the second melt channel in the nozzle and from the first melt source through the third melt channel in the nozzle and the gate into the cavity for a predetermined period of time. Each actuating mechanism also includes means to then further retract the elongated valve member to the fourth fully retracted open position wherein the front end of the elongated valve member is retracted sufficiently to allow simultaneous flow of melt from the first melt source through the central melt channel in the nozzle, melt from the second melt source through the second melt channel in the nozzle and melt from the first melt source through the third melt channel in the nozzle and the gate until the cavity is almost filled. It also includes means to then return the elongated valve member to the second position until the cavity is filled, and means to first drive the elongated valve member forwardly to the first closed position wherein the front end of the elongated valve member is seated in the gate to allow for ejection.

In another of its aspects, the invention provides a multi-cavity sprue gated injection molding apparatus for multi-layer molding having at least one melt distribution manifold with a front face and a plurality of heated nozzles mounted in a mold. Each heated nozzle has a rear end abutting against the melt distribution manifold and a front end adjacent a gate leading to a cavity in the mold. Each heated nozzle has a first central melt channel and second and third melt channels extending therethrough from the rear end to the front end. An elongated valve member has a rear end and a front end extending through the melt distribution manifold into the central melt channel in each heated nozzle. The rear end of each elongated valve member is operatively connected to valve member actuating mechanism mounted in the mold. A first melt passage for conveying melt from a first melt source branches in the melt distribution manifold dividing to extend both around the elongated valve member in the first central melt channel and through the third melt channel in each heated nozzle to the gate. A second melt passage for conveying melt from a second melt source branches in the melt distribution manifold and extends through the second melt channel in each heated nozzle to the gate. Each valve member actuating mechanism comprises a front cylinder and a rear cylinder both aligned in the mold with each elongated valve member. A first piston is seated in the front cylinder and connected to the rear end of the elongated valve member. A second piston is seated in the rear cylinder. A third piston is seated behind the second piston in the rear cylinder. The third piston has a stem portion which extends forwardly through an opening in the second piston into the first cylinder. First and second fluid lines from fluid pressure means are connected to the front cylinder on opposite sides of the first piston. A third fluid line from fluid pressure means is connected to the rear cylinder on the front side of the second piston, and a fourth fluid line from fluid pressure means is connected to the rear cylinder on the rear side of the third piston. Fluid pressure applied through the first, second, third and fourth fluid pressure lines reciprocates the elongated valve member between a first closed position and second, third and fourth positions according to a continuous predetermined injection cycle.

During this cycle, fluid pressure from the second fluid line is first released and fluid pressure is applied from the fourth fluid line to drive the second and third pistons forwardly and fluid pressure is applied from the first fluid line to drive the first piston and the elongated valve member rearwardly from the first closed position until the rear end of the first piston abuts against the front end of the third piston in the second position. In the second position, the front end of the elongated valve member is retracted sufficiently to allow melt flow from the first melt source through the third melt channel in the nozzle and the gate. After a short predetermined period of time, fluid pressure is applied from the third fluid line to drive the second piston to a rear position which allows the fluid pressure from the first fluid line to drive the first piston and the elongated member further rearwardly to the third position. In the third position, the front end of the elongated valve member is retracted sufficiently to allow simultaneous flow of melt from the second melt source through the second melt channel in the nozzle and melt from the first melt source through the third melt channel in the nozzle and the gate into the cavity. Then fluid pressure from the fourth fluid line is released and fluid pressure from the first fluid line then drives the first and second pistons and the elongated valve member to the fourth fully retracted open position. In the fourth position, the front end of the elongated valve member is retracted sufficiently to allow simultaneous flow of melt from the first melt source through the central melt channel in the nozzle, melt from the second melt source through the second melt channel in the nozzle and melt from the first melt source through the third melt channel in the nozzle and the gate. When the cavity is almost filled, fluid pressure from the third fluid line is released and fluid pressure is reapplied from the fourth fluid line to drive the first, second and third pistons forwardly and return the elongated valve member to the second position until the cavity is filled. Then fluid pressure is applied from the second fluid line to drive the first piston and the elongated valve member forwardly to the first closed position wherein the front end of the elongated valve member is seated in the gate to allow for ejection.

In still another of its aspects, the invention further provides a method of continuously injection molding multi-layer products in a multi-cavity injection molding apparatus having at least one melt distribution manifold with a front face and a plurality of heated nozzles mounted in a mold. Each heated nozzle has a rear end abutting against the melt distribution manifold and a front end adjacent a gate leading to a cavity in the mold. Each heated nozzle has a first central melt channel and second and third melt channels extending therethrough from the rear end to the front end. An elongated valve member has a rear end and a front end extending through the melt distribution manifold into the central melt channel in each heated nozzle. The rear end of each elongated valve member is operatively connected to valve member actuating mechanism mounted in the mold. A first melt passage for conveying melt from a first melt source branches in the melt distribution manifold dividing to extend both around the elongated valve member in the first central melt channel and through the third melt channel in each heated nozzle to the gate. A second melt passage for conveying melt from a second melt source branches in the melt distribution manifold and extends through the second melt channel in each heated nozzle to the gate. The method comprises the steps of first retracting the elongated valve member from a first closed position to a second position wherein the front end of the elongated valve member is retracted sufficiently to allow melt from the first melt source flow through the third melt channel in the nozzle and the gate into the cavity for a predetermined period of time. Then further retracting the elongated valve member to a third position wherein the front end of the elongated valve member is retracted sufficiently to allow simultaneous flow of melt from the second melt source through the second melt channel in the nozzle and from the first melt source through the third melt channel in the nozzle and the gate into the cavity for a predetermined period of time. Then further retracting the elongated valve member to a fourth fully retracted open position wherein the front end of the elongated valve member is retracted sufficiently to allow simultaneous flow of melt from the first melt source to the central melt channel in the nozzle, melt from the second melt source through the second melt channel in the nozzle and melt from the first melt source through the third melt channel in the nozzle and the gate until the cavity is almost filled. Then returning the elongated valve member to the second position until the cavity is filled, and finally driving the elongated valve member forwardly to the first closed position wherein the front end of the elongated valve member is seated in the gate to allow for ejection.

Further objects and advantages of the invention will appear from the following description taken togethers with the accompanying drawings.

DETAILED DESCRIPTION OF THE INVENTION

Figure 1:
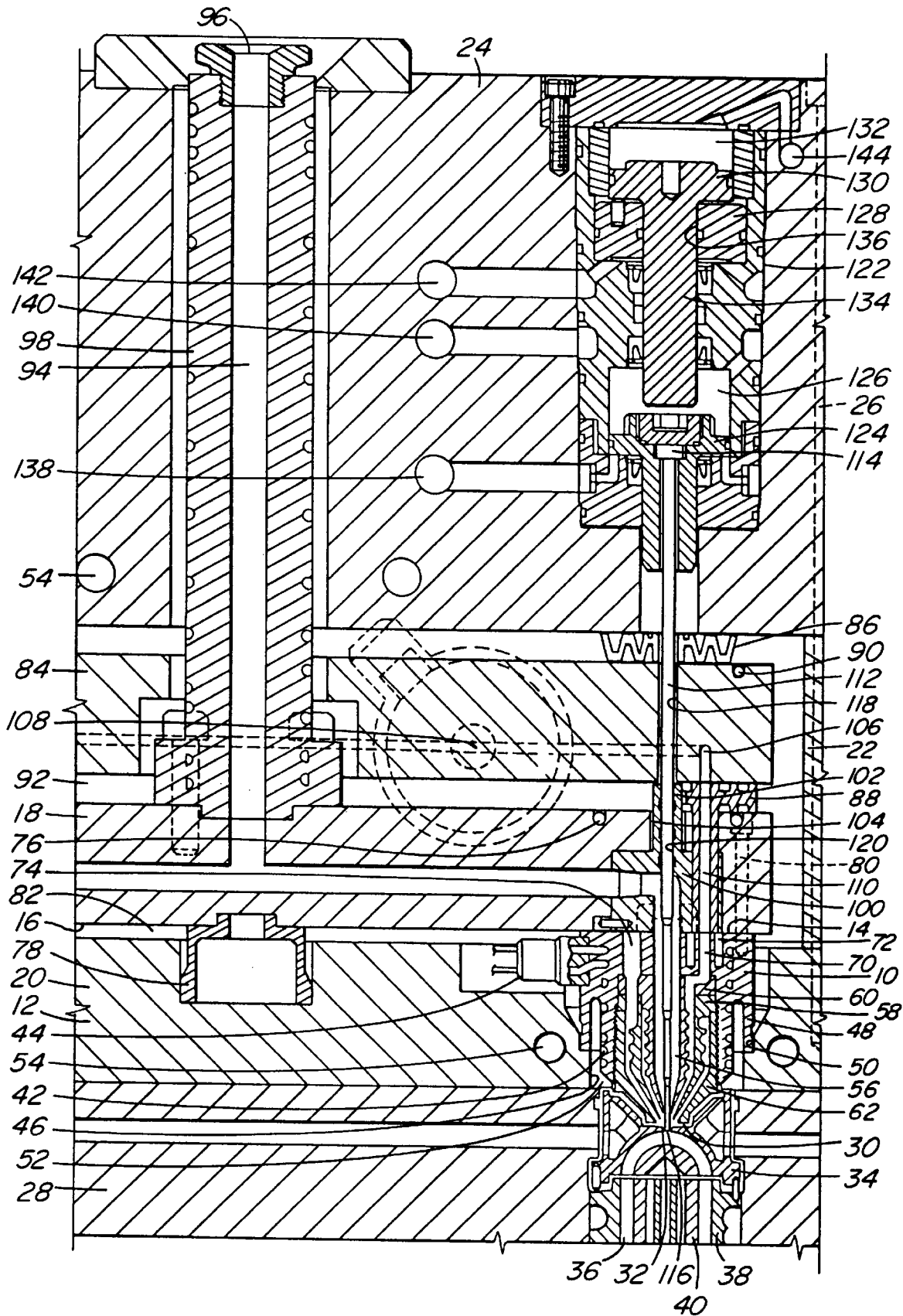
FIG. 1 is a sectional view of a portion of valve gated multi-cavity injection molding apparatus according to a first embodiment of the invention, showing the elongated valve member in a first closed position.

Reference is first made to FIG. 1 which shows a portion of valve gated multi-cavity injection molding apparatus for molding five layer preforms or other products by a combination of sequential and simultaneous coinjection. As indicated above, two layers of a barrier material such as ethylene vinyl alcohol copolymer (EVOH) or nylon are molded between two outer layers and a central layer of a polyethylene terephthalate (PET) type material. However, other materials having suitable characteristics can be used in other embodiments. A number of heated nozzles 10 are mounted in a mold 12 with a rear end 14 abutting against the front face 16 of a first front steel melt distribution manifold 18. While the mold 12 can have a greater number of plates depending upon the application, in this case, only a nozzle retainer plate 20, a manifold retainer plate 22 and a cylinder plate 24 secured together by bolts 26, as well as a cavity retainer plate 28 are shown for ease of illustration. The front tip end 30 of each heated nozzle 10 is aligned with a gate 32 extending through a cooled gate insert 34 to a cavity 36. This cavity 36 for making beverage bottle preforms extends between a cavity insert 38 and the mold core 40 in a conventional manner. While only a single heated nozzle 10 is shown for ease of illustration, in a typical configuration there will be many heated nozzles 10 (eg. 32, 48 or 64) seated in the mold 12 each aligned with a gate 32.

Each nozzle 10 is preferably heated by an integral electrical heating element 42 having a terminal 44. Each heated nozzle 10 is seated in an opening 46 in the nozzle retainer plate 20 with a rear collar portion 48 of each heated nozzle 10 received in a circular locating seat 50 extending around the opening 46. This provides an insulative air space 52 between the heated nozzle 10 and the surrounding mold 12 which is cooled by pumping cooling water through cooling conduits 54.

Each heated nozzle 10 has a central melt channel 56 extending from its rear end 14 to its front end 30. In this configuration shown, each heated nozzle 10 has an insert portion 58 which is secured in a seat 60 by a threaded nozzle seal 62 which is screwed into place and forms the front tip end 30 of the heated nozzle 10. As can better be seen in FIG. 2, the insert portion 58 is made of several pieces 64 which fit together to form an inner annular melt channel 66 extending around the central melt channel 56 to the front end 30 and an outer annular melt channel 68 extending around the inner annular melt channel 66 and the central melt channel 56 to the front end 30. In this configuration, the heated nozzle 10 has a single melt bore 70 extending from its rear end 14 to connect to the first or inner annular melt channel 64. A circle of spaced holes 72 are drilled in the rear end 14 of the heated nozzle 10 around the melt bore 70 to provide thermal separation for the melt flowing through the melt bore 70. The configuration shown also has four spaced melt bores 74 extending from the rear end 14 of the heated nozzle 10 to the outer annular melt channel 68.

The first front melt distribution manifold 18 is heated by an electrical heating element 76. It is located by a central locating ring 78 and screws 80 extending into each heated nozzle 10 to provide an insulative air space 82 extending between it and the surrounding cooled mold 12. A second rear steel melt distribution manifold 84 is mounted in the mold 12 by a number of insulative and resilient spacers 86 extending between it and the cylinder plate 24 to extend parallel to the front melt distribution manifold 18. As can be seen, the two manifolds 18, 84 are separated by thermal insulating melt transfer spacers 88 positioned between them. As described in more detail below, the rear melt distribution manifold 84 is heated by an integral electrical heating element 90 to a lower operating temperature than the front melt distribution manifold 18, and the air space 92 provided by the thermal insulating melt transfer spacers 88 between the two manifolds 18, 84 provides thermal separation between them.

A first melt passage 94 extends from a common inlet 96 through a cylindrical manifold extension 98 and branches in the first front melt distribution manifold 18, and, in this configuration, extends through a melt dividing bushing 100 seated in the front face 16 of the front melt distribution manifold 18 in alignment with each heated nozzle 10. The melt dividing bushing 100 is preferably made of three steel layers integrally brazed together as described in co-pending Canadian Application Serial No. 2,219,054 entitled, "Injection Molding Apparatus Having Melt Dividing Bushings" filed concurrently herewith. In this configuration, the melt dividing bushing 100 has a neck portion 102 extending rearwardly through an opening 104 in the front melt distribution manifold 18 to the rear melt distribution manifold 84. The first melt passage 94 divides again in each melt dividing bushing 100 and extends through the four melt bores 74 to the outer annular melt channel 66 as well as to the central melt channel 56 in each heated nozzle 10. A second melt passage 106 extends from a second inlet 108 and branches in the rear melt distribution manifold 84 to extend through a central bore 110 in each melt transfer spacer 88 to the aligned melt bore 70 extending from the rear end 14 of each heated nozzle 10 to the inner annular melt channel 66.

An elongated valve member 112 having a rear head 114 and a front end 116 which fits in the gate 32 extends through a bore 118 in the rear manifold 84, through an aligned central bore 120 in the melt dividing bushing 100 into the aligned central melt channel 56 in each heated nozzle 10. Each elongated valve member 112 is reciprocated through four different positions during the injection cycle by actuating mechanism 122 mounted in the cylinder plate 24 according to the invention. The elongated valve member 112 fits in part of the central bore 120 in the melt dividing bushing 100 tightly enough to prevent melt leakage around the elongated valve member 112 as it reciprocates. While hydraulic actuating mechanisms 122 are shown, of course, pneumatic actuating mechanisms can be used for other applications. In this embodiment of the invention, the head 114 of the elongated valve member 112 is connected to a first piston 124 seated in a front cylinder 126. Each actuating mechanism 122 also includes second and third pistons 128, 130 seated in a rear cylinder 132 aligned with the front cylinder 126. The third piston 130 is seated behind the second piston 128 and has a stem portion 134 which extends forwardly through a bore 136 in the second piston 128 into the front cylinder 126. As can be seen, first and second hydraulic lines 138, 140 extend to the front cylinder 126 on opposite sides of the first piston 124. A third hydraulic line 142 extends to the rear cylinder 132 on the front side of the second piston 128. A fourth hydraulic line 144 extends to the rear cylinder 132 on the rear side of the third piston 130. These hydraulic lines 138, 140, 142, 144 extend from a source (not shown) which applies hydraulic pressure to the different lines according to a predetermined program controlled by the injection cycle to reciprocate the elongated valve member 112 between first, second, third and fourth positions.

In use, the injection molding system is assembled as shown in FIG. 1 and operates to form five layer preforms or other products as follows. First, electrical power is applied to the heating element 76 in the front melt distribution manifold 18 and the heating elements 42 in the heated nozzles 10 to heat them to the operating temperature of the plastic material to be injected through the central melt channel 56. In a preferred embodiment, this material is a polyethylene terephthalate (PET) type material which has a melt temperature of about 565° F. Electrical power is also applied to the heating element 90 in the rear melt distribution manifold 84 to heat it to the operating temperature of the plastic material that is injected through the inner annular melt channel 66. This usually is a barrier material such as ethylene vinyl copolymer (EVOH) which has an operating temperature of about 400° F., but it can also be nylon. Water is supplied to the cooling conduits 54 to cool the mold 12 and the gate inserts 34. Hot pressurized melt is then injected from separate injection cylinders (not shown) into the first and second melt passages 94, 106 through inlets 96, 108 according to a predetermined injection cycle. As noted, the melt injected into the first melt passage 94 is a polyethylene terephthalate (PET) type material. The first melt passage 94 branches in the front melt distribution manifold 18 and extends to each melt dividing bushing 100 where it divides again and flows to the central melt channel 56 of the aligned heated nozzle 10 around the elongated valve member 112 as well as into four spaced holes 72 aligned with the four melt bores 74 in the rear end 14 of the heated nozzle 10 to the outer annular melt channel 68.

Usually, as noted, the melt injected into the second melt passage 106 is a barrier material such as ethylene vinyl copolymer (EVOH) or nylon. The second melt passage 106 branches in the rear melt distribution manifold 84 and extends through the central bore 110 in each melt transfer spacer 88 and the aligned melt bore 70 extending from the rear end of the heated nozzle 10 to the inner annular melt channel 66.

Figure 2:
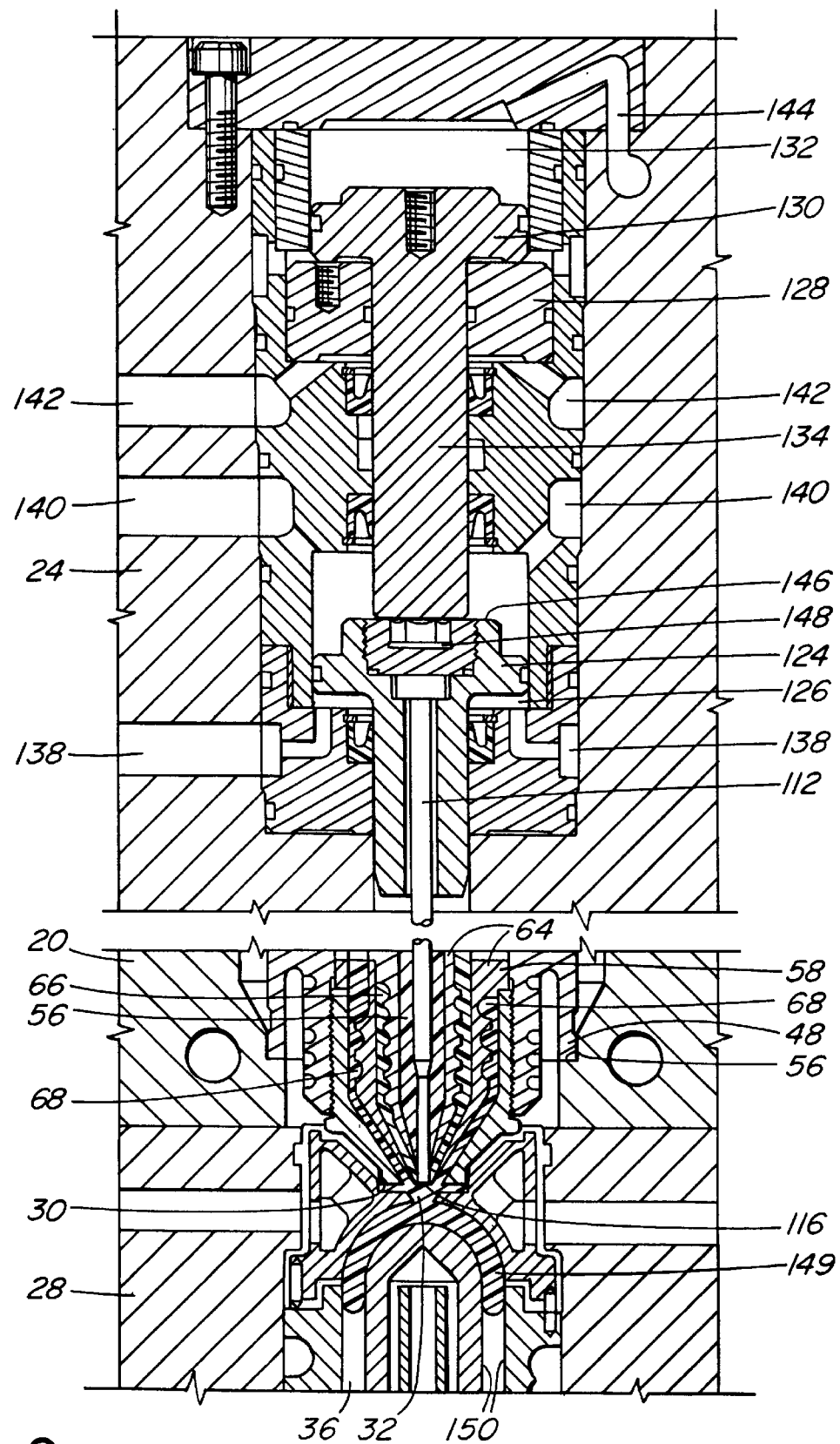
FIG. 2 is a partial sectional view of the same apparatus showing the elongated valve member in a second partially retracted position.
Figure 3:
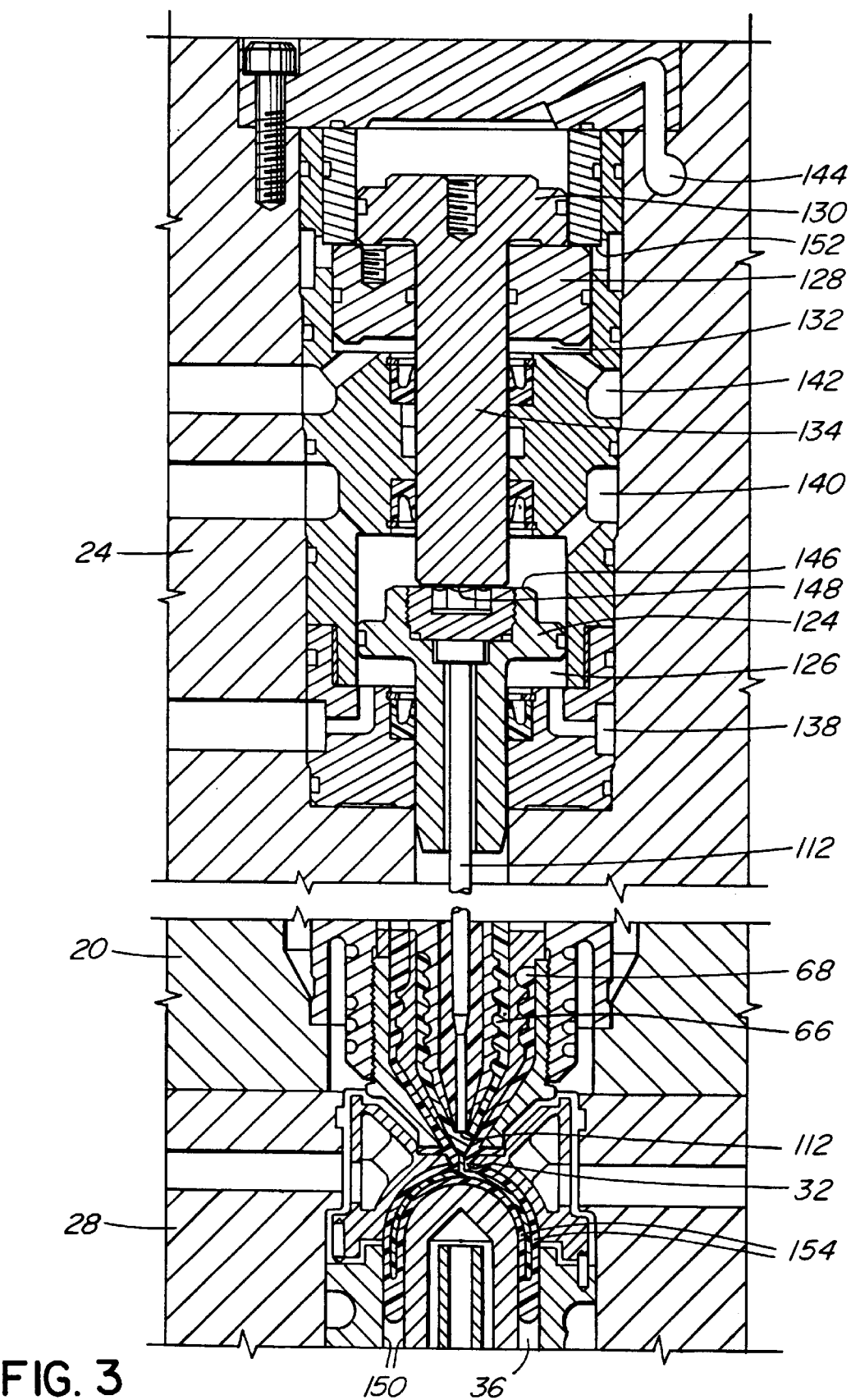
FIG. 3 is a similar view showing the elongated valve member in a third further retracted position.
Figure 4:
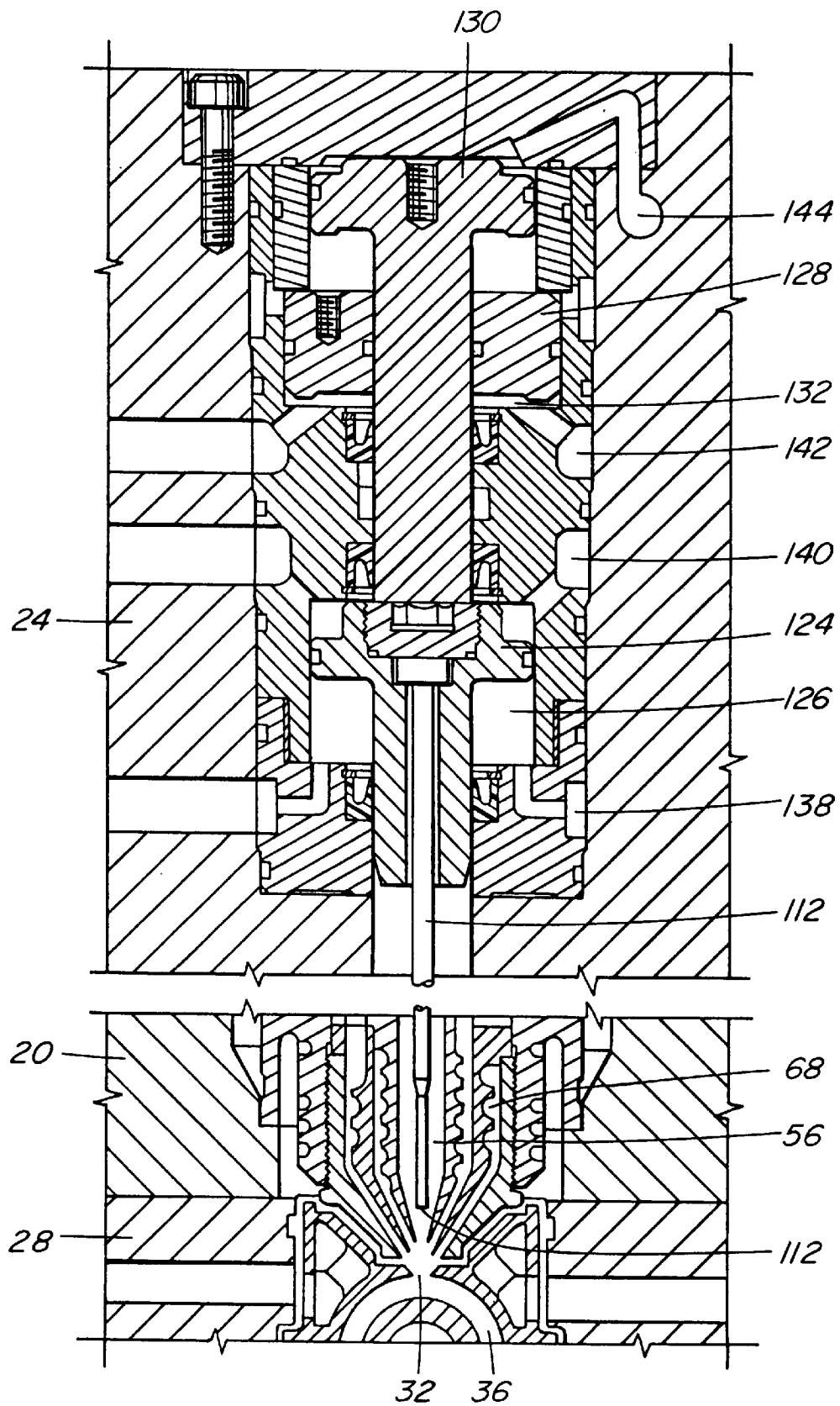
FIG. 4 is a similar view showing the elongated valve member in a fourth fully retracted open position.

As also seen in FIGS. 2, 3 and 4, the flow of PET from the first melt passage 94 and the barrier material from the second melt passage 106 through each gate 32 into the cavity 36 is controlled by the actuating mechanism 122 reciprocating the elongated valve member 112 between first, second, third and fourth positions during the injection cycle as follows. Initially, hydraulic pressure is applied from the second hydraulic line 140 to the front cylinder 126 behind the front piston 124 which drives the first piston 124 and the elongated valve member 112 forwardly to the first closed position shown in FIG. 1 wherein the front end 116 of the elongated valve member 112 is seated in the gate 32.

Next, the hydraulic pressure from the second hydraulic line 140 is released, and hydraulic pressure is applied from the fourth hydraulic line 144 to the rear cylinder 132 behind the third piston 130 which drives the second and third pistons 128, 130 forwardly. At the same time, fluid pressure is applied from the first hydraulic line 138 to the front cylinder 126 in front of the first piston 124 which drives the first piston 124 and the elongated valve member 112 rearwardly until they are stopped by the rear end 146 of the first piston 124 abutting against the front end 148 of the stem portion 134 of the rear cylinder 132 in the second position.

In this second position shown in FIG. 2, the front end 116 of the elongated valve member 112 is retracted sufficiently to allow PET to flow from the outer annular melt channel 68 through the gate 32 to the cavity 36. Thus, a predetermined initial quantity of PET 149 is injected into the cavities 36 through the first melt passage 94 and part of it adheres to the sides 150 of the cavities 36.

A short time after the start of PET injection, hydraulic pressure is applied from the third hydraulic line 142 to the rear cylinder 132 in front of the second piston 128 which drives the second piston 128 to a rear position against stop 152. This allows the hydraulic pressure from the first hydraulic line 138 to drive the first piston 124 and the elongated valve member 112 further rearwardly to the third position. In this third position shown in FIG. 3, the front end 116 of the elongated valve member 112 is further retracted sufficiently to allow both PET from the outer annular melt channel 68 and barrier material from the inner annular melt channel 66 to be coinjected simultaneously through the gate 32 to the cavity 36. As can be seen, the flow of the less viscous barrier material splits the flow of PET into two outer layers 154.

Figure 5:
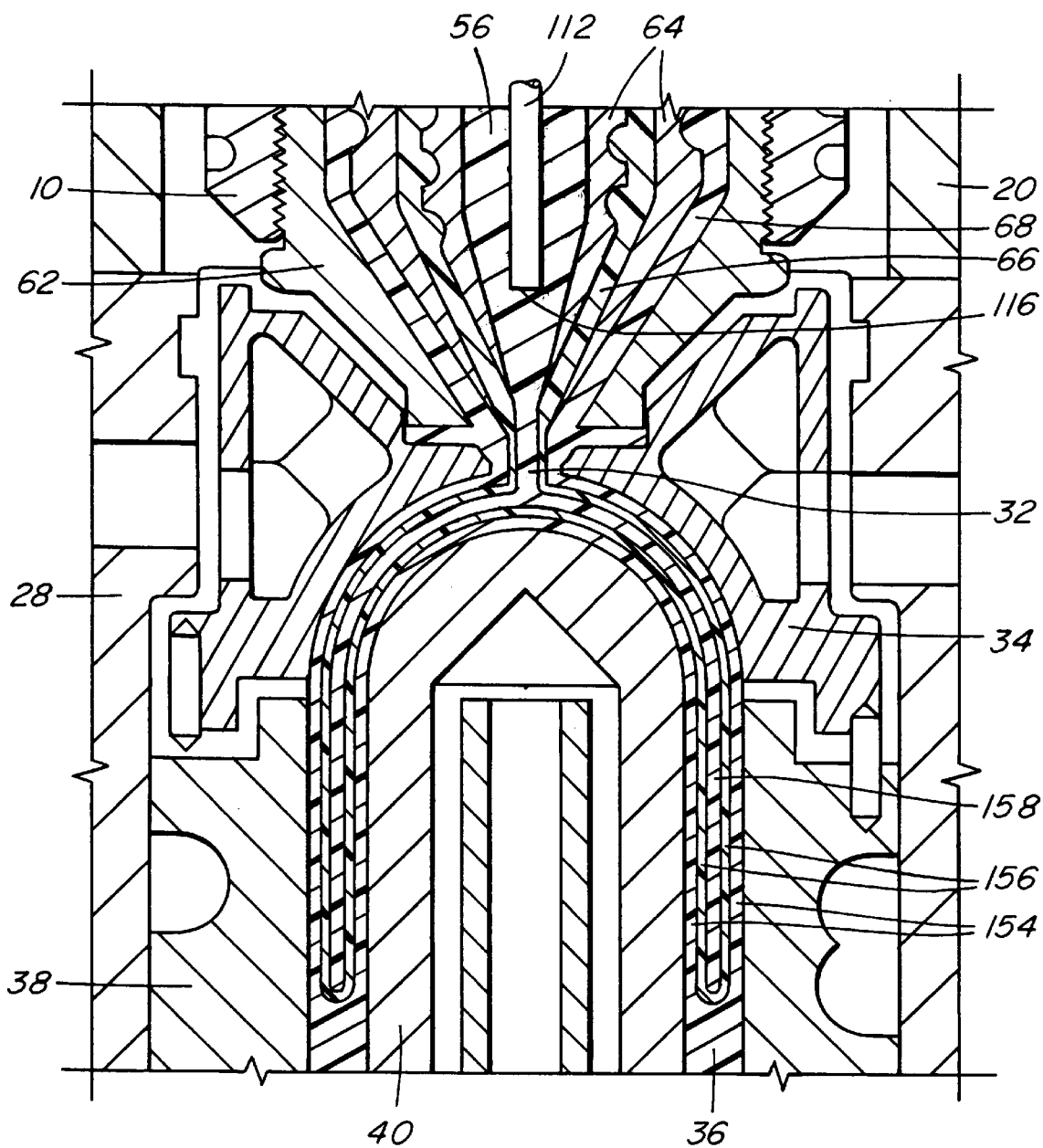
FIG. 5 is an enlarged view of a portion of FIG. 4 showing the melt flow into the cavity.

After the simultaneous flow of PET and the barrier material has been established, hydraulic pressure from the fourth hydraulic line 144 is released and the hydraulic pressure from the first fluid line 138 then drives the first and second pistons 124, 128 and the elongated valve member 112 to the fourth fully retracted open position. In this fourth open position shown in FIGS. 4 and 5, the front end of the elongated valve member 112 is retracted further sufficiently to also allow simultaneous flow of PET from the central melt channel 56 through the gate 32 to the cavity 36. As can be seen in FIG. 5, this inner flow of PET, in turn, splits the flow of the barrier material into two layers 156 on both sides of an inner layer 158 of PET.

When the cavities 36 are almost filled, the hydraulic pressure from the third hydraulic line 142 is released and hydraulic pressure is reapplied from the fourth hydraulic line 144 which drives the first, second and third pistons 124, 128, 130 forwardly and returns the elongated valve member 112 to the second position shown in FIG. 2 which stops the flow of the barrier material. After another small quantity of PET has been injected to complete filling of the cavities 36, the hydraulic pressure is then released from the fourth hydraulic line 144 and reapplied from the second hydraulic line 140 to return the first piston 124 and the elongated valve member 112 to the first closed position. After a short cooling period, the mold 12 is opened for ejection. After ejection, the mold is closed and the injection cycle is repeated continuously every 15 to 30 seconds with a frequency depending upon the wall thickness and the number and size of the cavities 36 and the exact materials being molded.

Figure 6:
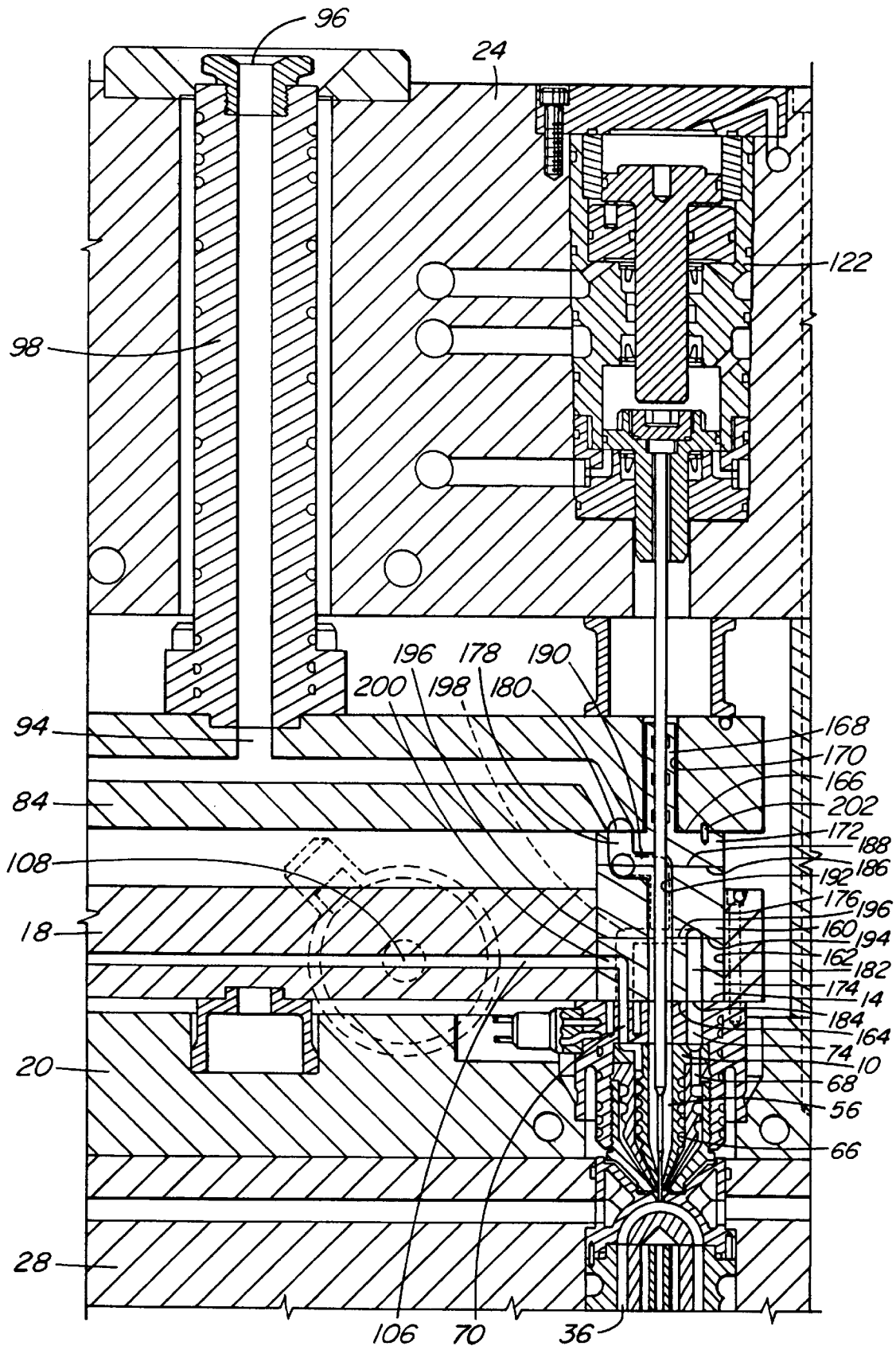
FIG. 6 is a sectional view of a portion of a multi-cavity sprue gated injection molding apparatus according to another embodiment of the invention.

Reference is now made to FIG. 6 showing injection molding apparatus according to another embodiment of the invention for valve gating five layer preforms or other products by a combination of sequential and simultaneous coinjection. As many of the elements are the same or similar to those described above, not all elements common to both embodiments are described again and those that are described again have the same reference numerals as before. In this case, the rear melt distribution manifold 84 rather than the front melt distribution manifold 18 has the manifold extension 98. Thus, the first melt passage 94 extends from the inlet 96 in the manifold extension 98 and branches in the rear melt distribution manifold 84 rather than the front melt distribution manifold 18. Furthermore, the second melt passage 106 extends from the second inlet 108 through the front melt distribution manifold 18 rather than the rear melt distribution manifold 84.

As can be seen, a melt transfer and dividing bushing 160 is mounted behind each heated nozzle 10 in a cylindrical opening 162 extending through the front melt distribution manifold 118 with its front end 164 abutting against the rear end 14 of the heated nozzle 10. In this embodiment, the rear end 166 of the melt transfer and dividing bushing 160 abuts against the rear melt distribution manifold 84 with a neck portion 168 extending into an opening 170 in the rear melt distribution manifold 84, but in other embodiments, the rear end 166 of the melt transfer and dividing bushing 160 can be seated in the rear melt distribution manifold 84. Each melt transfer and dividing bushing 160 is made by integrally joining together a first steel layer 172 at its rear end 166 with the neck portion 168, a third steel layer 174 at its front end 164 and a second steel layer 176 between the first and third layers 172, 174 as described in co-pending Canadian application serial no. 2,219,197 entitled "Injection Molding Apparatus Having Melt Transfer and Dividing Bushing" filed concurrently herewith. The first rear layer 172 has a hole 178 extending therethrough from an inlet 180 at the rear end 166. The third front layer 174 has four holes 182 extending therethrough to four outlets 184, each aligned with one of the four melt bores 74 extending to the outer annular channel 68 in the heated nozzle 10. The front face 186 of the first rear layer 172 and the rear face 188 of the second layer 176 are machined to have matching grooves which join when the three layers are joined together to form a first melt conduit 190 which branches to extend from the hole 178 in the first rear layer 172 to a central bore 192 through the melt transfer and dividing bushing 160 as well as to two spaced holes (not shown) which extend through the second layer 176 to two outlets on the front face 194 of the second layer 176. The front face 194 of the second layer 176 and the rear face 196 of the third front layer 174 are also machined to have two matching grooves which join when the three layers are joined together to form two curved second melt conduits 198. Each curved second melt conduit 198 branches from one of the outlets from the holes through the second layer to two of the four spaced holes 182 extending through the third layer 174 to the four outlets 184 at the front end 164 of the melt transfer and dividing bushing 160. Each of these four outlets 184 is aligned with one of the four melt bores 74 extending from the rear end 14 of the heated nozzle 10 to the outer annular melt channel 68. Thus, the first melt passage 94 which branches in the rear melt distribution manifold 84 to each melt transfer and dividing bushing 160 divides again as it passes through each melt transfer and dividing bushing 160 to extend to the central melt channel 56 and the outer annular melt channel 68 in each heated nozzle 10.

In this embodiment, the third front layer 174 of each melt transfer and dividing bushing 160 has an L-shaped melt passage 200 aligned with the second melt passage 106 which branches in the front melt distribution manifold 18 and the single melt bore 70 extending from the rear end 14 of the heated nozzle 10 to the inner annular melt channel 66 to form part of the second melt passage 106. A small dowel 202 extends from a melt transfer and dividing bushing 160 into the rear melt distribution manifold 84 to locate the melt transfer and dividing bushing 160 with the four spaced outlets 184 in alignment with the four melt bores 74 extending from the rear end 14 of the heated nozzle 10 to the outer annular channel 68. The operation of this embodiment of the invention is the same as that described above, and need not be repeated.

While the description of the valve gated injection molding apparatus for five layer molding has been given with respect to preferred embodiments, it will be evident that various modifications are possible without departing from the scope of the invention as understood by those skilled in the art and as defined in the following claims. For instance, other materials having suitable characteristics can be used rather than PET, EVOH and nylon.

The embodiments of the invention in which an exclusive property or privilege is claimed is defined as follow:

1. In a multi-cavity sprue gated injection molding apparatus for multi-layer molding having at least one melt distribution manifold with a front face and a plurality of heated nozzles mounted in a mold, each heated nozzle having a rear end abutting against the at least one melt distribution manifold and a front end adjacent a gate leading to a cavity in the mold, each heated nozzle having a first central melt channel and second and third melt channels extending therethrough from the rear end to the front end, an elongated valve member having a rear end and a front end extending through the at least one melt distribution manifold into the central melt channel in each heated nozzle, the rear end of each elongated valve member being operatively connected to valve member actuating mechanism mounted in the mold, a first melt passage for conveying melt from a first melt source branching in the at least one melt distribution manifold dividing to extend both around the elongated valve member in the first central melt channel and through the third melt channel in each heated nozzle to the gate, and a second melt passage for conveying melt from a second melt source branching in the at least one melt distribution manifold and extending through the second melt channel in each heated nozzle to the gate, the improvement wherein;

each valve member actuating mechanism reciprocates the elongated valve member between a first closed position and second, third and fourth positions according to a continuous predetermined injection cycle, each valve member actuating mechanism comprising;

(a) means to retract the elongated valve member from the first closed position to the second position wherein the front end of the elongated valve member is retracted sufficiently to allow melt from the first melt source flow through the third melt channel in the heated nozzle and the gate into the cavity for a predetermined period of time, (b) means to then further retract the elongated valve member to the third position wherein the front end of the elongated valve member is retracted sufficiently to allow simultaneous flow of melt from the second melt source through the second melt channel in the heated nozzle and from the first melt source through the third melt channel in the heated nozzle and the gate into the cavity for a predetermined period of time, (c) means to then further retract the elongated valve member to the fourth fully retracted open position wherein the front end of the elongated valve member is retracted sufficiently to allow simultaneous flow of melt from the first melt source through the central melt channel in the heated nozzle, melt from the second melt source through the second melt channel in the heated nozzle and melt from the first melt source through the third melt channel in the heated nozzle and the gate until the cavity is almost filled, (d) means to then return the elongated valve member to the second position until the cavity is filled, and (e) means to first drive the elongated valve member forwardly to the first closed position wherein the front end of the elongated valve member is seated in the gate to allow for ejection.

2. Injection molding apparatus as claimed in claim 1 wherein the second melt channel through each heated nozzle includes an inner annular melt channel extending around the central melt channel to the front end, and the third melt channel through each heated nozzle includes an outer annular melt channel extending around the inner annular melt channel to the front end.

3. Injection molding apparatus as claimed in claim 2 wherein the melt from the first source is polyethylene terephthalate (PET).

4. Injection molding apparatus as claimed in claim 3 wherein the melt from the second source is ethylene vinyl alcohol copolymer (EVOH).

5. Injection molding apparatus as claimed in claim 3 wherein the melt from the second source is nylon.

6. Injection molding apparatus as claimed in claim 2 wherein the first and third melt passages from the first melt source branch in a front melt distribution manifold mounted in the mold and the second melt passage from the second melt source branches in a rear melt distribution manifold mounted in the mold.

7. Injection molding apparatus as claimed in claim 3 wherein the front melt distribution manifold extends substantially parallel to and is spaced a predetermined distance from the rear melt distribution manifold and the second melt passage from the second melt source branches in the rear melt distribution manifold and then extends through melt bores in the front melt distribution manifold.

8. Injection molding apparatus as claimed in claim 2 wherein the first and third melt passages from the first melt source branch in a rear melt distribution manifold mounted in the mold and the second melt passage from the second melt source branches in a front melt distribution manifold mounted in the mold.

9. Injection molding apparatus as claimed in claim 8 wherein the front melt distribution manifold extends substantially parallel to and is spaced a predetermined distance from the rear melt distribution manifold and the first and third melt passage from the first melt source branch in the rear melt distribution manifold and then extends through melt bores in the front melt distribution manifold.

10. In a multi-cavity sprue gated injection molding apparatus for multi-layer molding having at least one melt distribution manifold with a front face and a plurality of heated nozzles mounted in a mold, each heated nozzle having a rear end abutting against the at least one melt distribution manifold and a front end adjacent a gate leading to a cavity in the mold, each heated nozzle having a first central melt channel and second and third melt channels extending therethrough from the rear end to the front end, an elongated valve member having a rear end and a front end extending through the at least one melt distribution manifold into the central melt channel in each heated nozzle, the rear end of each elongated valve member being operatively connected to valve member actuating mechanism mounted in the mold, a first melt passage for conveying melt from a first melt source branching in the at least one melt distribution manifold dividing to extend both around the elongated valve member in the first central melt channel and through the third melt channel in each heated nozzle to the gate, and a second melt passage for conveying melt from a second melt source branching in the at least one melt distribution manifold and extending through the second melt channel in each heated nozzle to the gate, the improvement wherein;

each valve member actuating mechanism comprises a front cylinder and a rear cylinder both aligned in the mold with each elongated valve member, a first piston seated in the front cylinder and connected to the rear end of the elongated valve member, a second piston seated in the rear cylinder, and a third piston seated behind the second piston in the rear cylinder, the third piston having a stem portion which extends forwardly through an opening in the second piston into the first cylinder, first and second fluid lines from fluid pressure means connected to the front cylinder on opposite sides of the first piston, a third fluid line from fluid pressure means connected to the rear cylinder on the front side of the second piston, and a fourth fluid line from fluid pressure means connected to the rear cylinder on the rear side of the third piston, whereby applying fluid pressure through the first, second, third and fourth fluid pressure lines reciprocates the elongated valve member between a first closed position and second, third and fourth positions according to a continuous predetermined injection cycle wherein fluid pressure from the second fluid line is first released and fluid pressure is applied from the fourth fluid line to drive the second and third pistons forwardly and fluid pressure is applied from the first fluid line to drive the first piston and the elongated valve member rearwardly from the first closed position until the rear end of the first piston abuts against the front end of the third piston in the second position wherein the front end of the elongated valve member is retracted sufficiently to allow melt flow from the first melt source through the third melt channel in the heated nozzle and the gate, after a short predetermined period of time, fluid pressure is applied from the third fluid line to drive the second piston to a rear position which allows the fluid pressure from the first fluid line to drive the first piston and the elongated member further rearwardly to the third position wherein the front end of the elongated valve member is retracted sufficiently to allow simultaneous flow of melt from the second melt source through the second melt channel in the heated nozzle and melt from the first melt source through the third melt channel in the heated nozzle and the gate into the cavity, and then fluid pressure from the fourth fluid line is released and fluid pressure from the first fluid line then drives the first and second pistons and the elongated valve member to the fourth fully retracted open position wherein the front end of the elongated valve member is retracted sufficiently to allow simultaneous flow of melt from the first melt source through the central melt channel in the heated nozzle, melt from the second melt source through the second melt channel in the heated nozzle and melt from the first melt source through the third melt channel in the heated nozzle and the gate, when the cavity is almost filled, fluid pressure from the third fluid line is released and fluid pressure is reapplied from the fourth fluid line to drive the first, second and third pistons forwardly and return the elongated valve member to the second position until the cavity is filled, and then fluid pressure is applied from the second fluid line to drive the first piston and the elongated valve member forwardly to the first closed position wherein the front end of the elongated valve member is seated in the gate to allow for ejection.

11. Injection molding apparatus as claimed in claim 10 wherein the second melt channel through each heated nozzle includes an inner annular melt channel extending around the central melt channel to the front end, and the third melt channel through each heated nozzle includes an outer annular melt channel extending around the inner annular melt channel to the front end.

* * * * *